Sept. 25, 1923.
H. ABBOTT
1,468,987
REGULATING MECHANISM FOR COMPRESSORS
Filed April 24, 1919  2 Sheets-Sheet 2
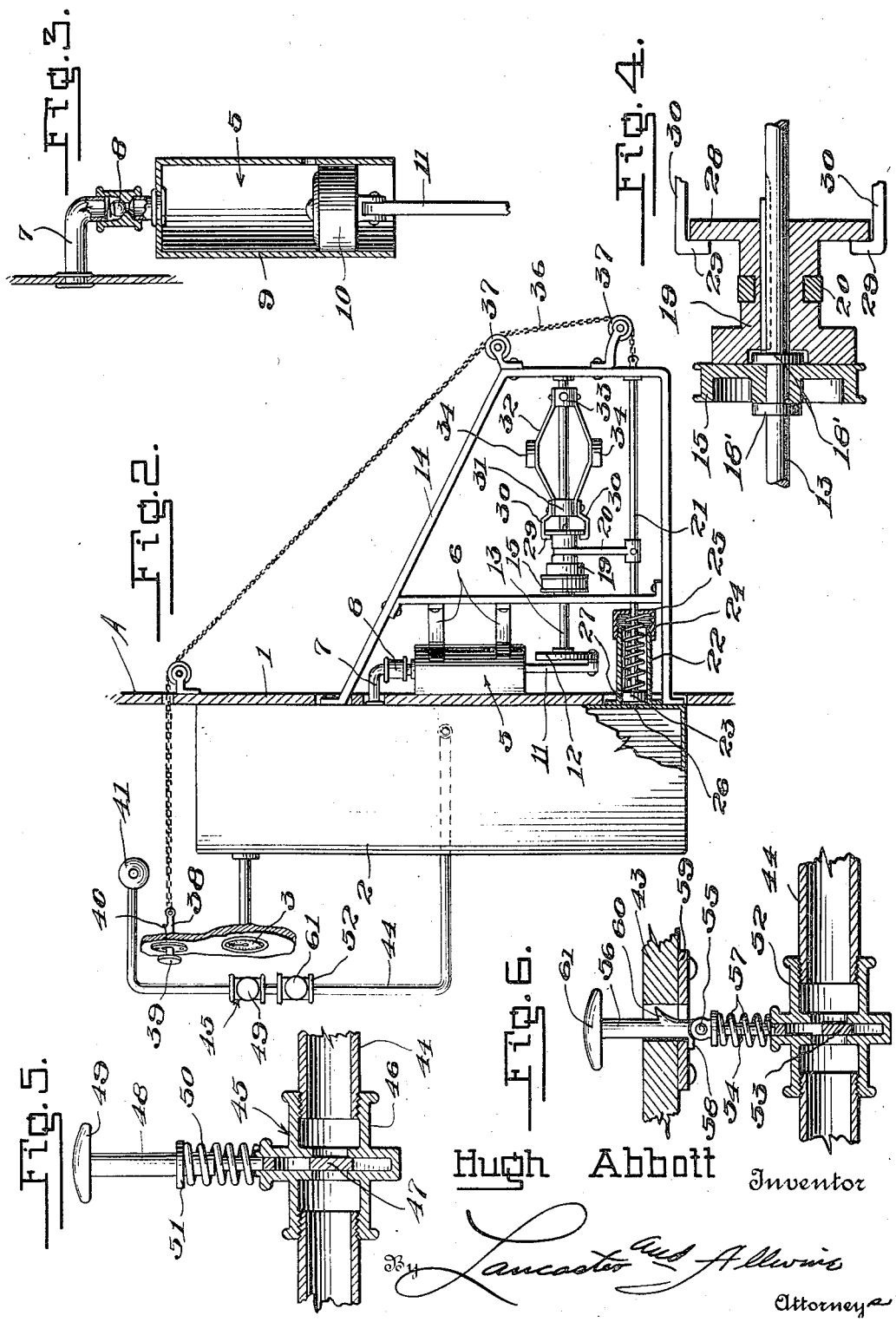
Hugh Abbott Inventor
By Lancaster and Allwine
Attorneys Patented Sept. 25, 1923.

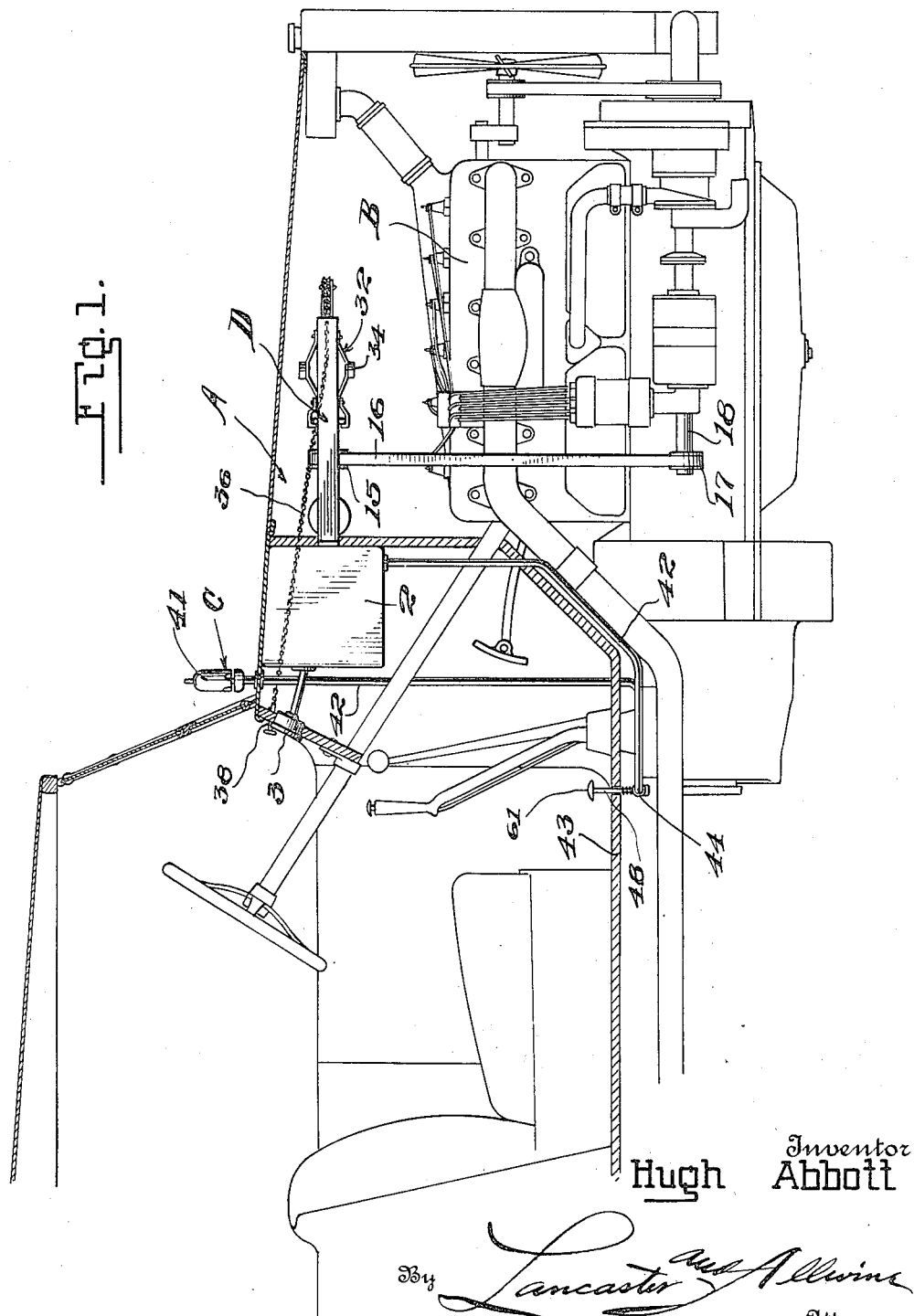

1,468,987

UNITED STATES PATENT OFFICE.

HUGH ABBOTT, OF HILL CITY, SOUTH DAKOTA.

REGULATING MECHANISM FOR COMPRESSORS.

Application filed April 24, 1919. Serial No. 292,368.

*To all whom it may concern:*

Be it known that I, HUGH ABBOTT, a citizen of the United States, and a resident of Hill City, in the county of Pennington and State of South Dakota, have invented certain new and useful Improvements in Regulating Mechanisms for Compressors, of which the following is a specification.

This invention relates to improvements in regulating mechanisms for compression and more particularly to designating mechanism for compressors which are used in connection with audible signals for motor vehicles. The main object of the present invention is the provision of novel regulating mechanism for compressors which will cause the operating mechanism of the compressors to cease operating when a predetermined pressure value has been reached.

Other objects of the invention are to provide an air compressor, for compressing air in a suitable storage tank from which the air passing to the signal or whistle being controlled in its passage by the above mentioned valve and to provide means for connecting the air compressor with the prime mover or motor of the motor vehicle to operate the air compressor by the operation of the motor, to provide a clutch mechanism for controlling the operation of the compressor, which clutch mechanism is normally held in an operative position by a spiral spring, the said spring adapted to be acted upon and depressed under the predetermined pressure within the compressed air tank to operate said clutch to arrest operation of the air compressor, and further to provide a governor mechanism which is operatively connected to said clutch and will arrest operation of the air compressor when the motor of the motor vehicle reaches or passes above a predetermined speed which excessive speed might break the air compressor.

Other objects of the invention will appear from the following detailed description taken in connection with the accompanying drawings forming a part of this specification and in which drawings:

Figure 1 is a fragmentary section through a motor vehicle showing the improved audible signal applied thereto.

Figure 2 is a top plan of the signal and its operating mechanism.

Figure 3 is a vertical section through the air compressor.

Figure 4 is a longitudinal section through the clutch section for controlling the operation of the air compressor.

Figure 5 is a vertical section through the operating valve of the signal, and

Figure 6 is a section through the tone controlling valve of the signal.

Referring more particularly to the drawings, wherein like characters indicate like and corresponding parts, A generically indicates the motor vehicle, which is driven by the usual type of motor B. The audible signal or whistle C is operated by compressed air which air is compressed by suitable compressor structures D, that is, operatively connected to the motor B. The dash board 1 of the motor vehicle or automobile A has a tank 2 attached thereto in any suitable manner, which tank is adapted to retain the compressed air for operating the signal mechanism C. A compressure gauge 3 is carried by the instrument board of the motor vehicle and is connected to the tank 2 to register the pressure of the compressed air therein.

The air compressor 5 which charges the tank 2 is suitably supported against the dash 1 by the supporting bracket structure 6, and it has communication with the interior of the tank 2 through a pipe 7, for forcing the air under pressure into the tank. A check valve 8 is interposed in the length of the pipe 7 to prevent back pressure of the air into the cylinder 9 of the air compressor 5. The air is compressed in the cylinder 5 by the reciprocatory action of a piston 10, as is ordinary in this type of air compressor. The piston rod 11 which is pivotally connected to the piston 10 has its outer end eccentrically connected to a disc 12 mounted upon a shaft 13. The shaft 13 is rotatably supported by a suitable bracket structure 14 and it has a pulley 15 rotatably mounted thereon. A belt 16 passes about the pulley 15 and about a pulley 17 which is carried by the shaft 18 of the motor or prime mover structure B. This shaft 18 may be the shaft of the motor which is employed for operating the generator, cooling system pump, or any other convenient shaft about the motor structure. The pulley 15 is held against longitudinal movement upon the shaft 13 by spaced collars 18', and it is adapted to have frictional engagement at one side thereof with one end of a friction clutch 19. The friction clutch 19 is feathered upon the shaft 13 and has a forked lever 20 connected thereto intermediate its ends. The forked lever 20 is in turn connected to a rod 21 slidably supported by the bracket structure 14. The rod 21 extends into the cylinders 22, which is attached to the tank 2 in any suitable manner. A piston 23 is mounted upon the end of the rod 21 within the cylinder 22 and a spiral spring 24 is coiled about the rod, engaging the piston 23 at one end, and the inner surface of the cap 25 of the cylinder at its opposite end. This spring 24 is tensioned to normally hold the clutch 19 in frictional engagement with one side of the pulley 15 to rotate the shaft 13 by operation of the motor B. The wall or guide of the tank 2 against which the cylinder 22 is attached is provided with a relatively small opening 26 opening into the cylinder 22 to permit air to pass from the tank 2 into the cylinder. When the pressure of the air in the tank 2 reaches a predetermined degree or passes thereabove, it will enter the cylinder 22, and overcome the pressure of the spring 24, and moving the rod 21 longitudinally and consequently shifting the clutch 19 out of engagement with the pulley 15 allowing the latter to rotate idly upon the shaft 13 and arresting operation of the air compressor 5. The cylinder 22 is provided with an opening 27 in the side thereof to permit the escape of the air therethrough, and thus the pressure of the air within the tank 2 may be lowered or relieved and consequently maintained at substantially the desired pound pressure. The clutch 19 has an annular flange 28 formed upon its ends remote from the end which engages the pulley 15. This flange 28 is engaged by the inturned end 29 of a pair of arms 30. The arms 30 are carried by the collar 31 of a governor structure 32. The governor structure or mechanism 32 is mounted upon the shaft 13, the collar 31 thereof being slidably mounted upon the shaft while the other collar 33 is keyed or otherwise suitably attached to the shaft, thus when the rotation of the shaft 13 increases, under high speed of the motor vehicle and also of the engine B, the weights 34 of the governor structure will spread or move away from the axis of the shaft 13, consequently drawing the collar 31 toward the collar 33 as is the ordinary operation of a spring arm governor mechanism. This spreading of the weights 34 of the governor mechanism under high speed will shift the clutch 19 out of engagement with the cooling system and arrest operation of the compressor 5 so as to prevent the breaking of the compressor by the operation thereof at an excessive speed.

A chain or analogous flexible member 36 which passes over suitable guide keys and is connected to a relatively short rod 38 which extends through the instrument board of the motor vehicle A and has a head 39 upon its outer end to facilitate the longitudinal movement of the pin 38 to the rod 21 to operate the clutch 19, manually when it is desired to disconnect the compressor mechanism and the motor B. A spur 40 is formed upon the rod 38 and is adapted for engagement against the instrument board to hold the rod in outward position and consequently hold the rod 21 in position to prevent operation of the compressor 5.

The audible signal comprises the whistle 41 which may be of any approved type, adapted to make a sound or signal upon the flow of a fluid such as compressed air therethrough. This whistle 41 is supported by its fluid feeding pipe 42 and it may be located at any desired position upon the motor vehicle A, preferably above the cowl or hood and in front of the wind shield, as shown in Figure 1; however, it is to be understood that the whistle may be placed at any desired location upon the vehicle without departing from the spirit of this invention.

The feed pipe 42 extends downwardly through the floor 43 of the motor vehicle A and extends transversely across the vehicle beneath the board, providing a transverse link 44. From the transverse link 44 of the feed pipe it extends forwardly beneath the floor and upwardly and forwardly beneath the foot rest or foot board of the vehicle up through the latter to the tank 2, to which it is connected as clearly shown in Figures 1 and 2 of the drawings, to permit the flow of compressed air from the tank 2 to the whistle 41. A valve mechanism 45 is interposed in the transverse horizontal length 44 of the feed pipe and it includes the usual type of valve casing 46 having a slidable gate 47 mounted therein for controlling the passage of the fluid through the valve casing and to the whistle 41. A valve stem 48 is connected to the gate 47 and extends upwardly through the floor 43 of the motor vehicle, having a head 49 upon its upper end. A spiral spring 50 is coiled about the stem 48 engaging against the collar 51 at its upper end and against the valve casing 46 at its lower end, the said spring forcing the stem and head 49 upwardly and consequently forcing the gate 47 upwardly to cut off the flow of fluid through the valve casing, the said gate adapted to be forced downwardly upon pressure of the foot of the drive of the vehicle to allow the fluid to pass to the whistle 41 to operate the same.

Positioned in the feed pipe 42 between the tank 2 and valve mechanism 45 is a tone control valve structure which includes a valve casing 52 in which is mounted a vertically slidable gate 53 having a stem 54 connected thereto for operating the same. The stem 54 is pivotally connected as shown at 55 to a second stem 56 which projects upwardly through the floor 43 of the motor vehicle. The gate valve 53 is urged upwardly by the spring 57, and the upward movement of the gate valve is limited by a lug 58 formed upon the stem 56 which engages against the under surface of a wear plate 59 carried by the floor 43, thus holding the gate valve 53 partially closed for constricting the passage way through which the fluid passes from the tank 2 to the valve mechanism 45. When the movement of the gate valve 53 is limited by the lug 58 only a relatively small quantity of compressed air or fluid is admitted for passage to the whistle 41 when the gate valve 47 is opened, thus retarding the density or magnitude of the sound created by the whistle 41, making the whistle adaptable for city use, however, when touring it is desired to increase the volume of sound created by the whistle 41, and to do this the gate valve 53 is forced downwardly to increase the passage way through the valve casing 52 to allow the greater quantity of the compressed air or fluid to pass to the whistle 41. A second lug 60 is carried by the stem 56 above the lug 58 and when the stem 56 is depressed for this lug 60 to engage beneath the surface of the wear plate 59, the gate valve will be held in its open position to allow the increased quantity of compressed air to pass to the whistle. Thus it is only necessary to abut the valve gate 53 to regulate the volume of sound created by the whistle 41 and the operator need pay no particular attention to the scope of movement imparted to the valve stem 48 and the gate valve 47 for regulating the volume of sound of the signal. The pivotal connection between the stems 54 and 56 permits the stem 56 to be rocked to move the lugs 58 and 68 into or out of position for engagement against the under surface of the wear plate 59. The valve stem 56 has the usual type of head or petal 61 upon its upper edge.

Generically the operation of the improved signal is as follows: When the engine or motor B of the motor vehicle A is started, it will transmit motion to the pulley 16 and from this pulley through the clutch 19 to the shaft 13, for rotating the disc 12 and reciprocating the piston 10 of the air compressor 5, compressing air in front of the piston and forcing the compressed air under pressure into the tank 2. When the air in the tank reaches or passes above a predetermined pound pressure, it will overcome the action or tension of the spring 24 and move the rod 24 to cut off the connection between the clutch 19 and the pulley 15, consequently arresting operation of the compressor 5 or in case the engine or motor B reaches or passes a certain speed, and which the operation of the compressor thereby would be liable to break the compressor, the governor mechanism will act for disconnecting the clutch and the pulley 15.

While using the vehicle in cities the tone control valve mechanism is set to permit only a limited or relatively small quantity of the compressed air to pass to the whistle 41 and when it is desired to sound the whistle, the driver of the vehicle may, by pressure of his foot depress the pin 48 and the gate valve 47 allowing the fluid or compressed air to flow into or out of the whistle 41. By controlling the operation or pressing of the stem 48, any predetermined tone or signal may be made by means of the whistle 41. In touring, when it is desired to have a louder and more audible signal, the valve stem 46 is depressed to cause the lugs 50 to engage against the wear plates 59 and permit a relatively large quantity of compressed air to pass through the whistle upon operation of the gate valve 47.

Changes in details may be made without departing from the spirit of this invention, but;

I claim:

1. The combination of a motor vehicle including a motor, an air compressor, a tank for receiving the air from the compressor, a cylinder having communication with the tank, a piston reciprocably mounted within the cylinder, a shaft arranged adjacent the cylinder, means operatively connecting the shaft with the compressor, a clutch mechanism on said shaft, a governor mechanism on said shaft for operating said clutch for controlling the operation of said compressor, a piston rod connected to said piston and extending in parallel relation to said shaft, and an arm secured to said piston rod and operatively connected with said clutch for permitting the disconnection of the compressor from said shaft when the pressure in said tank has reached a predetermined value, and means for manually operating said piston rod.

2. The combination of a motor vehicle including a motor, an air compressor, a tank for receiving the air from the compressor, a cylinder having communication with the tank, a piston reciprocably mounted within the cylinder, a shaft arranged adjacent the cylinder, means operatively connecting the shaft with the compressor, a clutch on said shaft, means for operating said clutch for controlling the operation of the compressor, a piston rod connected to the piston and extending in parallel relation to the shaft, means forming operative connection between the piston rod and clutch for disconnecting the compressor from the shaft when the pressure in the tank reaches a predetermined value, and means for manually operating said piston rod.

HUGH ABBOTT.